(12) United States Patent
Worley

(10) Patent No.: US 6,857,684 B2
(45) Date of Patent: Feb. 22, 2005

(54) HARD-TOP CONVERTIBLE ROOF APPARATUS

(75) Inventor: Randall Worley, Canton, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/636,074

(22) Filed: Aug. 7, 2003

(65) Prior Publication Data

US 2004/0032145 A1 Feb. 19, 2004

Related U.S. Application Data

(60) Provisional application No. 60/403,714, filed on Aug. 15, 2002.

(51) Int. Cl.$^7$ ................................................ B60J 10/12
(52) U.S. Cl. .......................... 296/100.06; 296/107.04; 296/108
(58) Field of Search .............................. 296/93, 100.06, 296/100.09, 100.1, 107.04, 107.06, 107.08, 107.16, 107.17, 108, 121, 213, 216.06, 216.07, 218, 216.7; 49/484.1, 495.1, 498.1

(56) References Cited

U.S. PATENT DOCUMENTS

| | | | |
|---|---|---|---|
| 1,979,490 A | | 11/1934 | Robertson |
| 4,350,734 A | | 9/1982 | Hammond |
| 4,475,766 A | | 10/1984 | McKee |
| 4,516,803 A | | 5/1985 | Kaltz et al. |
| 4,529,243 A | | 7/1985 | Kaltz et al. |
| 4,537,440 A | | 8/1985 | Brockway et al. |
| 4,595,230 A | | 6/1986 | Fettes |
| 4,653,801 A | | 3/1987 | Shirasu et al. |
| 4,653,802 A | | 3/1987 | Watanabe et al. |
| 4,698,252 A | | 10/1987 | Koch et al. |
| 4,729,593 A | * | 3/1988 | Nisiguchi et al. ...... 296/107.04 |
| 4,746,163 A | | 5/1988 | Muscat |
| 4,893,868 A | | 1/1990 | Miller et al. |
| 4,978,165 A | | 12/1990 | Schreiter et al. |
| 5,095,592 A | | 3/1992 | Doerfling |
| 5,490,709 A | | 2/1996 | Rahn |
| 5,511,844 A | | 4/1996 | Boardman |
| 5,743,587 A | | 4/1998 | Alexander et al. |
| 5,769,483 A | | 6/1998 | Danzl et al. |
| 5,775,767 A | | 7/1998 | Harrison et al. |
| 5,785,375 A | | 7/1998 | Alexander et al. |
| 5,829,820 A | | 11/1998 | Cowsert |
| 5,851,048 A | | 12/1998 | Fujita et al. |
| 5,950,366 A | | 9/1999 | Uhlmeyer |
| 5,979,970 A | | 11/1999 | Rothe et al. |
| 6,102,467 A | | 8/2000 | Laurain et al. |
| 6,318,793 B1 | | 11/2001 | Rapin et al. |
| 6,336,673 B1 | | 1/2002 | Rothe et al. |
| 6,347,828 B1 | | 2/2002 | Rapin et al. |
| 6,390,532 B1 | | 5/2002 | Mac Farland |
| 6,497,447 B1 | | 12/2002 | Willard |
| 6,511,118 B2 | | 1/2003 | Liedmeyer et al. |
| 6,557,921 B2 | | 5/2003 | Wezyk et al. |
| 6,575,521 B2 | | 6/2003 | Tarahomi |

(List continued on next page.)

FOREIGN PATENT DOCUMENTS

| | | |
|---|---|---|
| DE | 197 56 021 C1 | 12/1998 |
| GB | 2 295 801 | 6/1996 |
| WO | WO 02/96685 | 12/2002 |

Primary Examiner—Lori L. Coletta
(74) Attorney, Agent, or Firm—Harness, Dickey & Pierce, P.L.C.

(57) ABSTRACT

A hard-top convertible roof apparatus is provided. Another aspect of the present invention employs rigid hard-top front and/or rear roof sections. A further aspect of the present invention provides that the outside surfaces of retractable roof sections have a generally vertical orientation when in their open and retracted positions. In yet another aspect of the present invention, a roof structure has diverging peripheral flanges. A first roof flange retains a roof-to-roof weatherstrip and an adjacent second roof flange retains an interior trim panel, in still another aspect of the present invention.

29 Claims, 9 Drawing Sheets

U.S. PATENT DOCUMENTS

| | | |
|---|---|---|
| 6,578,898 B2 | 6/2003 | Rothe et al. |
| 6,641,202 B2 | 11/2003 | Graf et al. |
| 6,648,405 B2 | 11/2003 | Bunsmann et al. |
| 6,659,534 B2 * | 12/2003 | Willard ..................... 296/108 |
| 6,685,252 B2 * | 2/2004 | Graf et al. .................. 296/108 |
| 2001/0013712 A1 | 8/2001 | Fischer et al. |
| 2003/0034668 A1 | 2/2003 | Quindt |

* cited by examiner

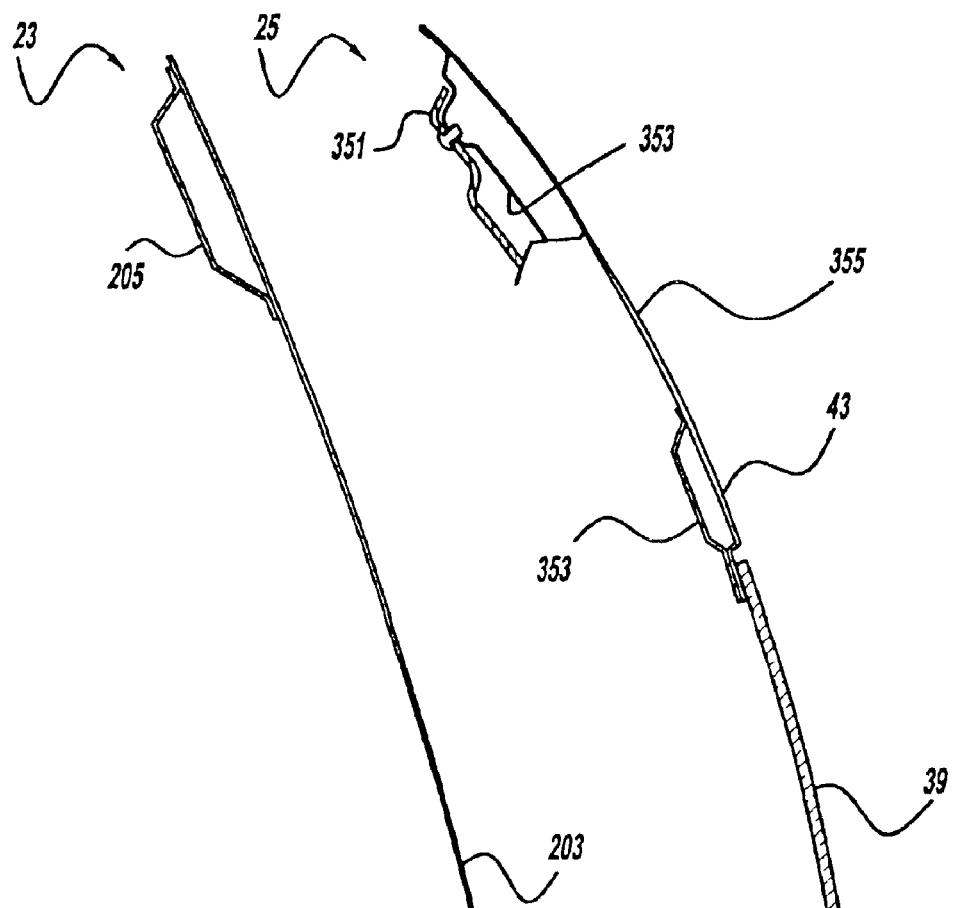
Figure - 4
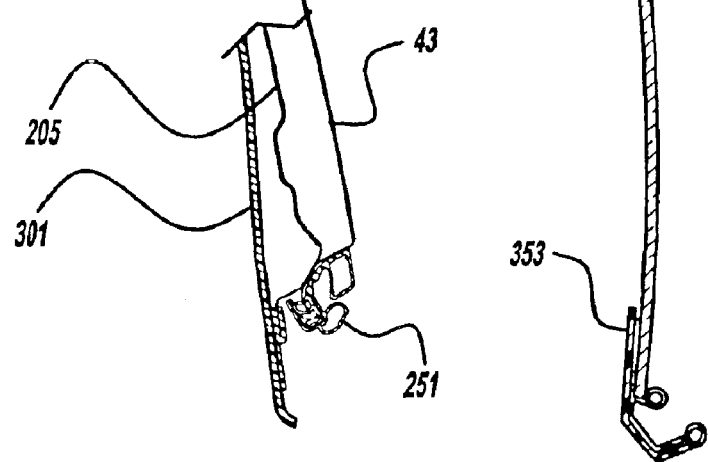

HARD-TOP CONVERTIBLE ROOF APPARATUS

BACKGROUND AND SUMMARY OF THE INVENTION

This invention relates generally to roof systems in automotive vehicles and more particularly to a hard-top convertible roof apparatus.

Rigid hard-top convertible roofs have been used on a variety of automotive vehicles. Some of these conventional convertible hard-top roofs are stored in a generally vertical orientation and some are stored in a predominantly horizontal orientation. Furthermore, some of these conventional hard-top roofs fold in a clamshelling manner while others are collapsible in an overlapping manner. Examples of traditional hard-top convertible roofs are disclosed in the following patents: U.S. Pat. No. 6,347,828 entitled "Actuation Mechanism for a Two Piece Retractable Hard-Top Roof for an Automobile" which issued to Rapin et al. on Feb. 19, 2002; U.S. Pat. No. 6,318,793 entitled "Two Piece Retractable Hard-Top Roof for an Automobile" which issued to Rapin et al. on Nov. 20, 2001; U.S. Pat. No. 5,979,970 entitled "Roof Assembly for a Convertible Vehicle" which issued to Rothe et al. on Nov. 9, 1999; U.S. Pat. No. 5,785,375 entitled "Retractable Hard-Top for an Automotive Vehicle" which issued to Alexander et al. on Jul. 28, 1998; U.S. Pat. No. 5,769,483 entitled "Convertible Motor Vehicle Roof" which issued to Danzl et al. on Jun. 23, 1998; U.S. Pat. No. 5,743,587 entitled "Apparatus for Use in an Automotive Vehicle having a Convertible Roof System" which issued to Alexander et al. on Apr. 28, 1998; and EPO Patent Publication No. 1 092 580 A1 which was published on Apr. 18, 2001. The U.S. patents are incorporated by reference herein.

Most automotive vehicle weatherstrips include hollow bulbs disposed on a generally U-shaped carrier. The carrier is typically pushed onto a double thickness pinch weld flange of the mating vehicle panels. Various weatherstrips are also known for removable roofs including that disclosed in exemplary U.S. Pat. No. 5,950,366 entitled "Seal Structure for Removable Roof" which issued to Uhlmeyer on Sep. 14, 1999.

Furthermore, many traditional headliners are used to aesthetically cover the interior surface of convertible and stationary roofs. Typical convertible roof headliners are made from a sheet of stretched fabric or vinyl, fabric or vinyl covered resinated foam, or fabric or vinyl covered resinated fiberglass. Such foam-based headliner materials are disclosed within the following U.S. Pat. Nos.: 5,095,592 entitled "Fastener Device for Composite Materials" which issued to Doerfling on Mar. 17, 1992; U.S. Pat. No. 4,698,252 entitled "Composite Foam Articles and Method for Fabricating Such Articles" which issued to Koch et al. on Oct. 6, 1987; and U.S. Pat. No. 4,350,734 entitled "Integral Composite Foam Product and Method" which issued to Hammond on Sep. 21, 1982; all of which are incorporated by reference herein. Many conventional convertible headliners are attached to the supporting structure, such as roof inner panels or roof bows, by polymeric Christmas-tree fasteners, hook-and-loop type fasteners, or polymeric interior trim garnish moldings.

In accordance with the present invention, a hard-top convertible roof apparatus is provided. Another aspect of the present invention employs rigid, hard-top front and/or rear roof sections. A further aspect of the present invention provides that the outside surfaces of retractable roof sections have a generally vertical orientation when in their open and retracted positions. In yet another aspect of the present invention, a roof structure has diverging peripheral flanges. A first roof flange retains a roof-to-roof weatherstrip and an adjacent second roof flange retains an interior trim panel, in still another aspect of the present invention. Another aspect of the present invention uses a weatherstrip for a convertible hard-top roof which has a pair of spaced apart, yet connected, bulbs, with the entire weatherstrip being interior of the outer roof surface when the roof is fully raised. In a further aspect of the present invention, a method of assembling a hard-top convertible roof apparatus is also provided.

The apparatus of the present invention is advantageous over conventional systems in that the present invention is expected to provide superior water sealing. The present invention is also advantageous by simplifying assembly of components to a roof system. Furthermore, the present invention weatherstrip does not present an unsightly appearance from outside the vehicle since it is not exposed thereby also reducing undesirable aerodynamic noise. The interior trim fastening arrangement of the present invention is advantageous over prior devices by employing hidden yet inexpensive fasteners. Additional advantages and features of the present invention will become apparent from the following description and appended claims, taken in conjunction with the accompanying drawings.

BRIEF DESCRIPTION OF THE DRAWINGS

FIG. 4 is a centerline cross sectional view, taken along line 4—4 of FIG. 3, showing the preferred embodiment apparatus, disposed in the fully retracted position;

DETAILED DESCRIPTION OF THE PREFERRED EMBODIMENT

Figure 1:
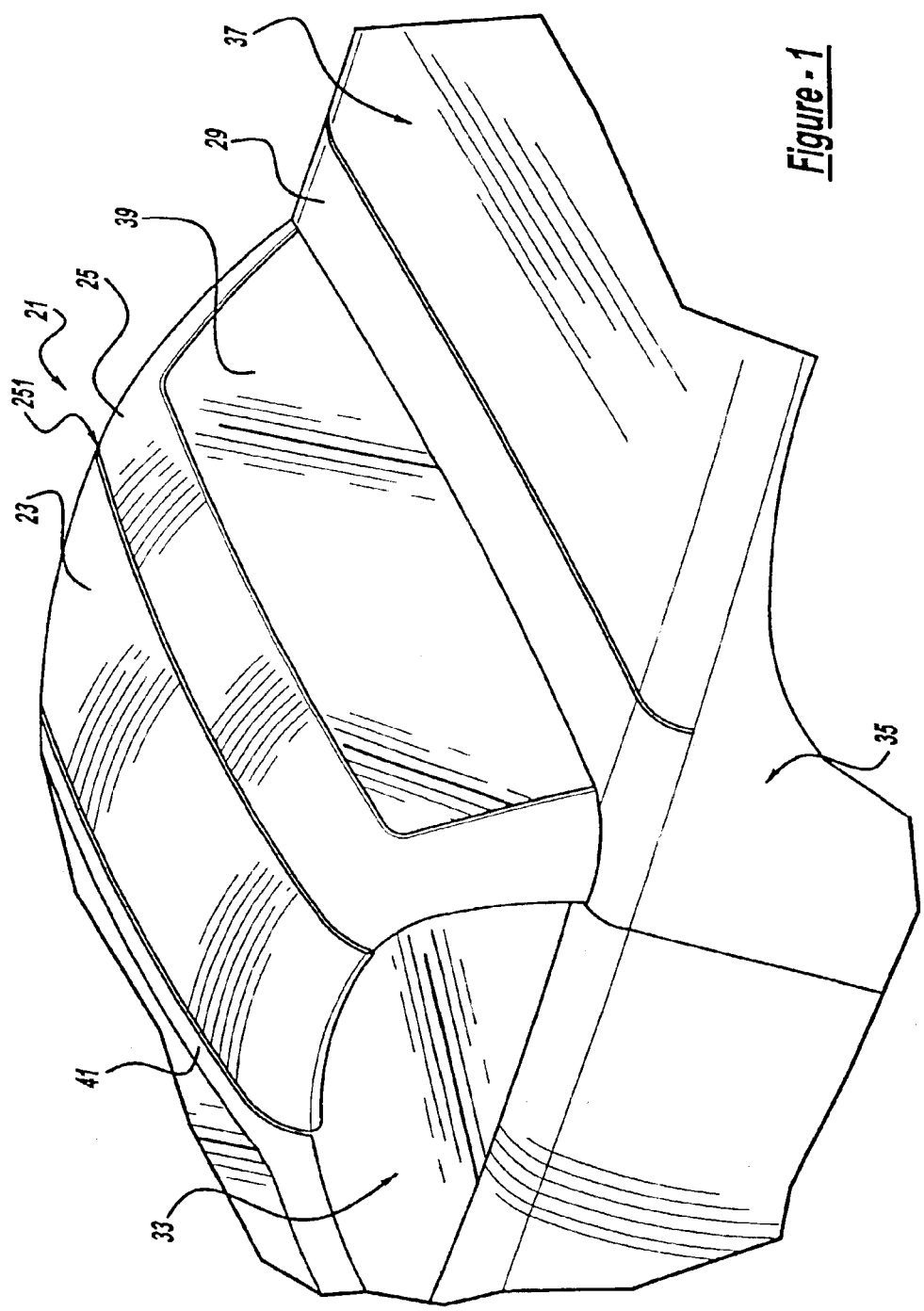
FIG. 1 is a fragmentary, perspective view, as observed from the rear left corner of the vehicle, showing the preferred embodiment of a hard-top convertible roof apparatus of the present invention, disposed in a fully closed and raised position.
Figure 2:
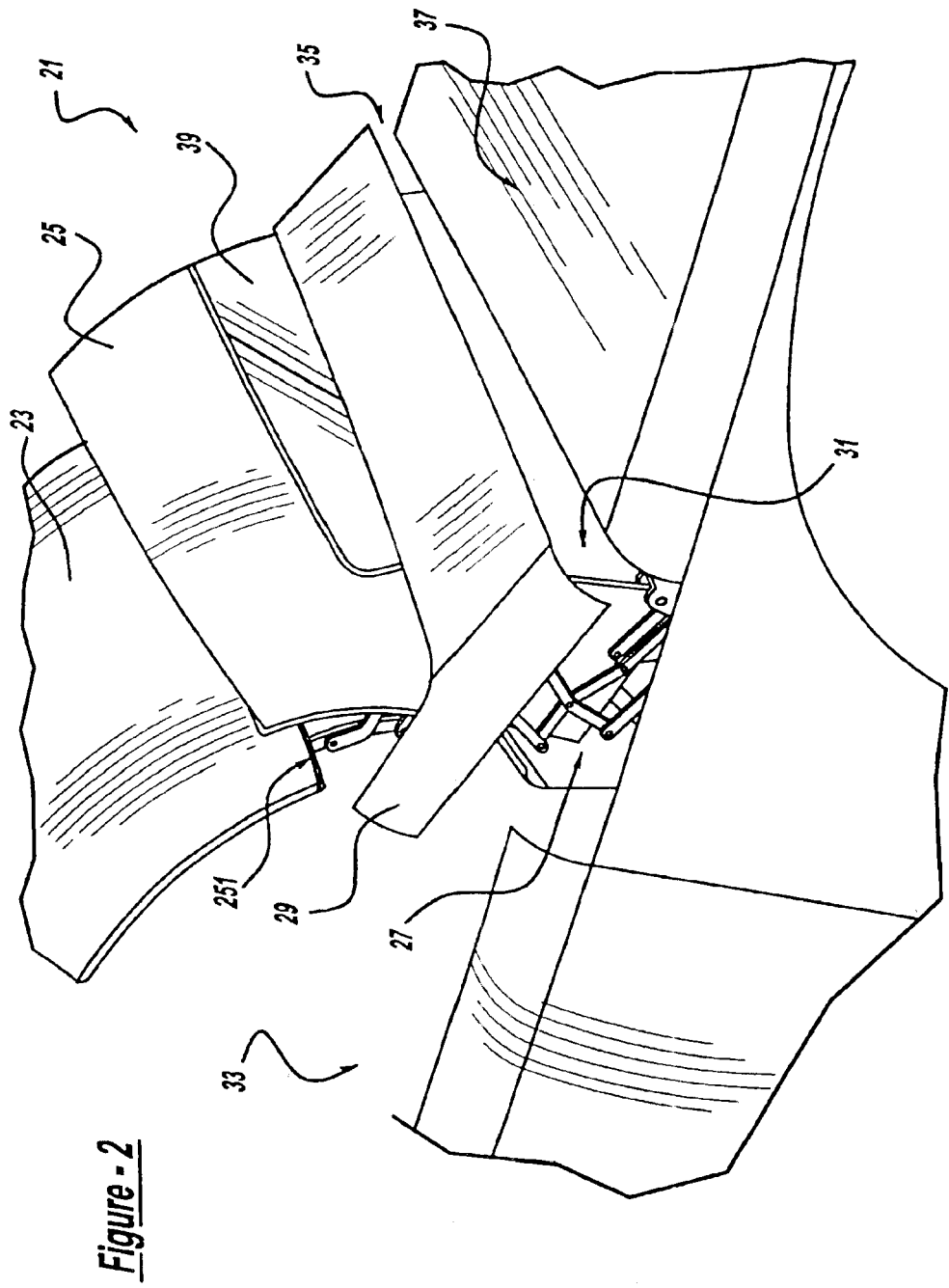
FIG. 2 is a fragmentary and perspective view, like that of FIG. 1, showing the preferred embodiment apparatus, disposed in a partially retracted position.
Figure 3:
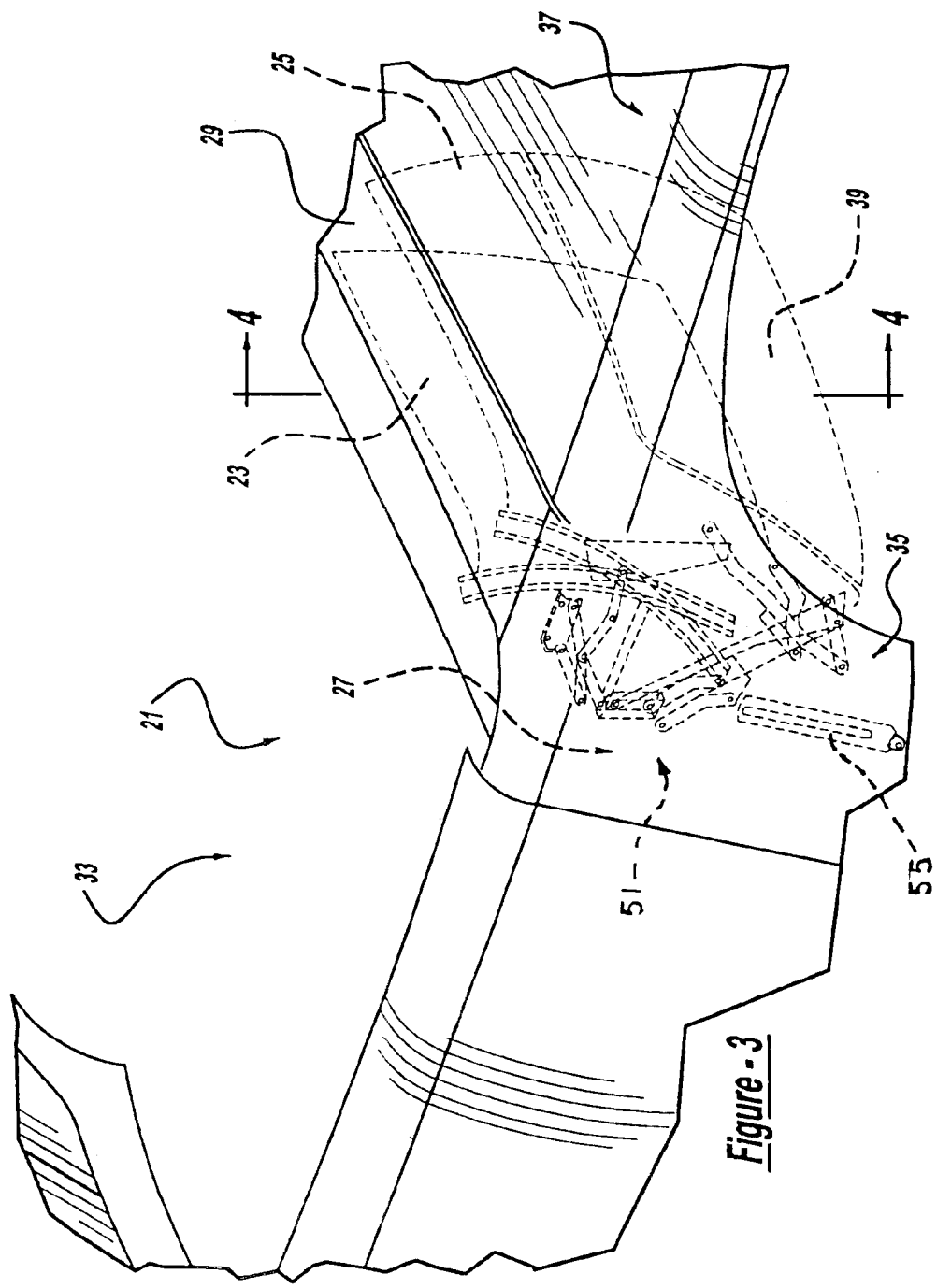
FIG. 3 is a fragmentary and perspective view, like that of FIG. 1, showing the preferred embodiment apparatus, disposed in a fully open and retracted position.
Figure 5:
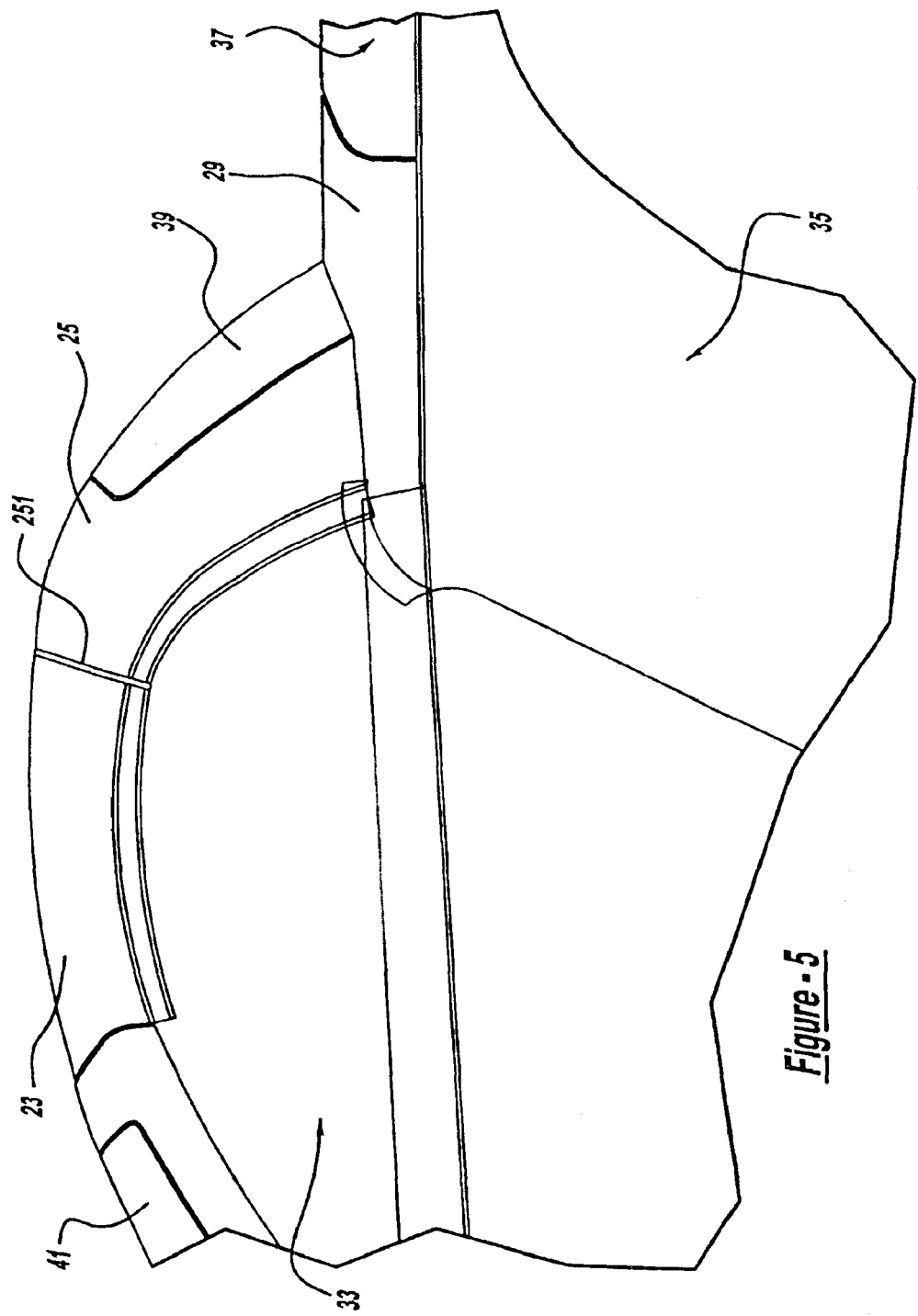
FIG. 5 is a side diagrammatic view showing the preferred embodiment apparatus, disposed in the fully raised position.
Figure 6:
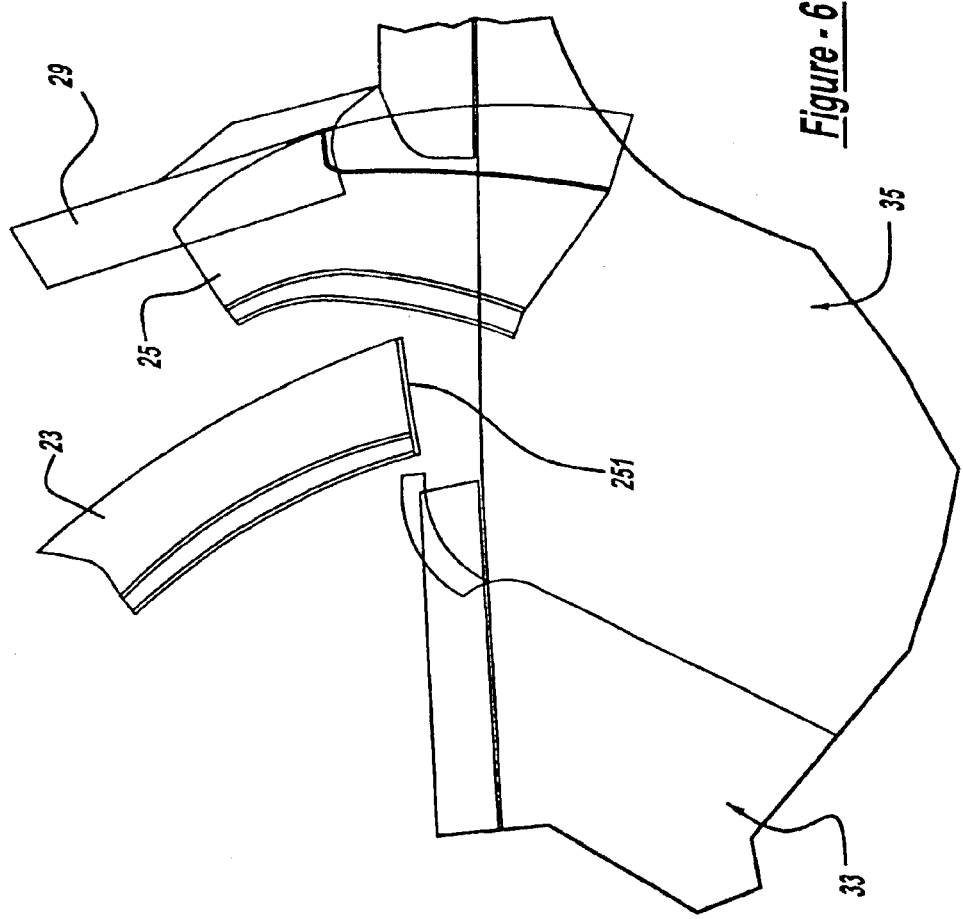
FIG. 6 is a side diagrammatic view showing the preferred embodiment apparatus, disposed in the partially retracted position.
Figure 7:
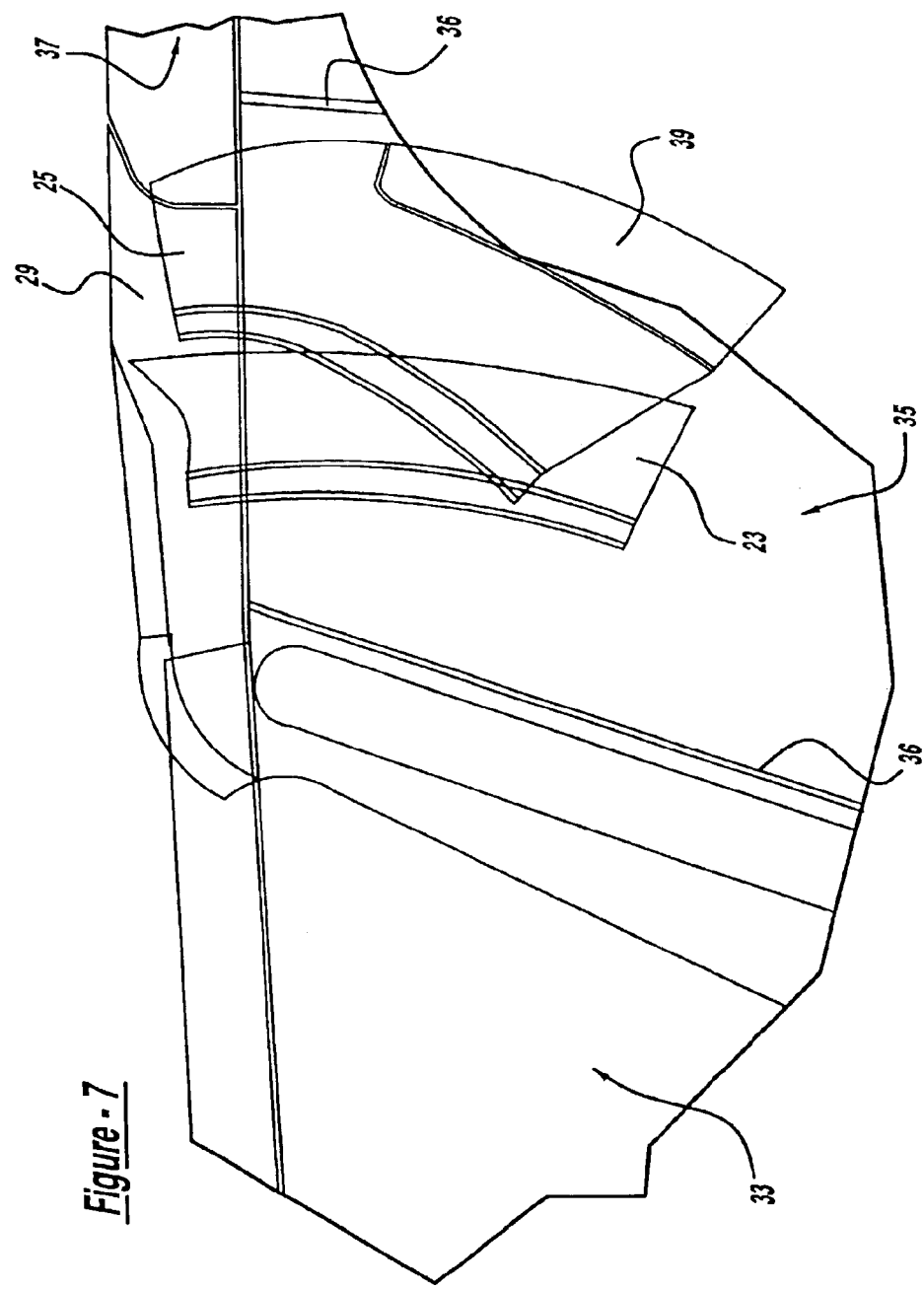
FIG. 7 is a side diagrammatic view showing the preferred embodiment apparatus, disposed in the fully retracted position.

Referring to FIGS. 1–7, a convertible roof system 21 is part of an automotive vehicle and includes a hard-top front roof section 23, a hard-top rear roof section 25, a top stack mechanism 27 operable to move the roof sections, a rigid tonneau cover 29 and a tonneau cover mechanism 31. Roof sections 23 and 25 are automatically movable from fully raised and closed positions covering a passenger compartment 33, as shown in FIGS. 1 and 5, to fully retracted and open positions, as shown in FIGS. 3, 4 and 7, wherein roof sections 23 and 25 are stowed in a roof storage area or compartment 35. Roof storage compartment 35 is located between and physically separated by metal panels 36 (see FIG. 7) from passenger compartment 33 and an externally accessible storage area for miscellaneous articles such as a trunk or pickup truck bed 37. A rigid, glass back window or backlite 39 is secured to rear roof section 25 while front roof section 23 is disengagably attached to a front header panel 41 by latches. Roof sections 23 and 25 are preferably stamped from steel sheets and include inner reinforcement panels, but the roof panels may alternately be formed from polymeric composites or aluminum. Roof sections 23 and 25 have opaque outside surfaces 43 that are typically painted. These outside surfaces 43 define three-dimensionally curved planes which are stored in a predominantly vertical and parallel nested orientation when fully retracted and stowed; this can be observed best in FIGS. 4 and 7.

Top stack mechanism 27 is in mirrored symmetry in both outboard sides of the vehicle. Top stack mechanism 27 includes a pair of linkage assemblies 51 and a pair of hydraulic actuators 55. Linkage assemblies 51 are preferably constructed in accordance with German patent application serial number 101 39 354.7 entitled "Carbiolet-Fahrzeug" (Vehicle) which was filed on Aug. 17, 2001, which is incorporated by reference herein. Roof sections 23 and 25 can be tightly and closely nested together when fully retracted and the centerline, fore-and-aft roof storage area opening can be minimized due to linkage assemblies 51.

Figure 8:
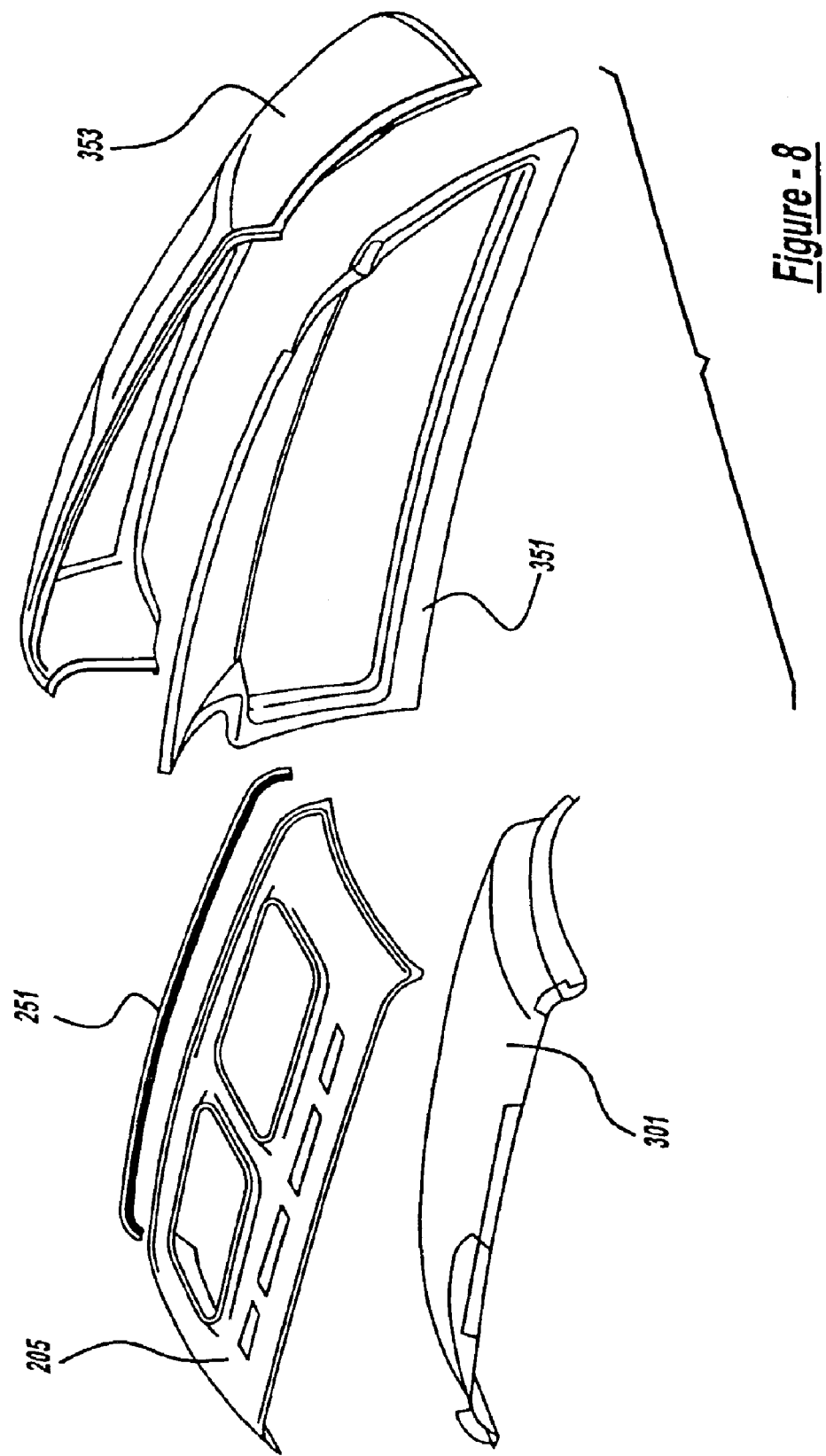
FIG. 8 is an exploded perspective view showing the preferred embodiment apparatus.
Figure 9:
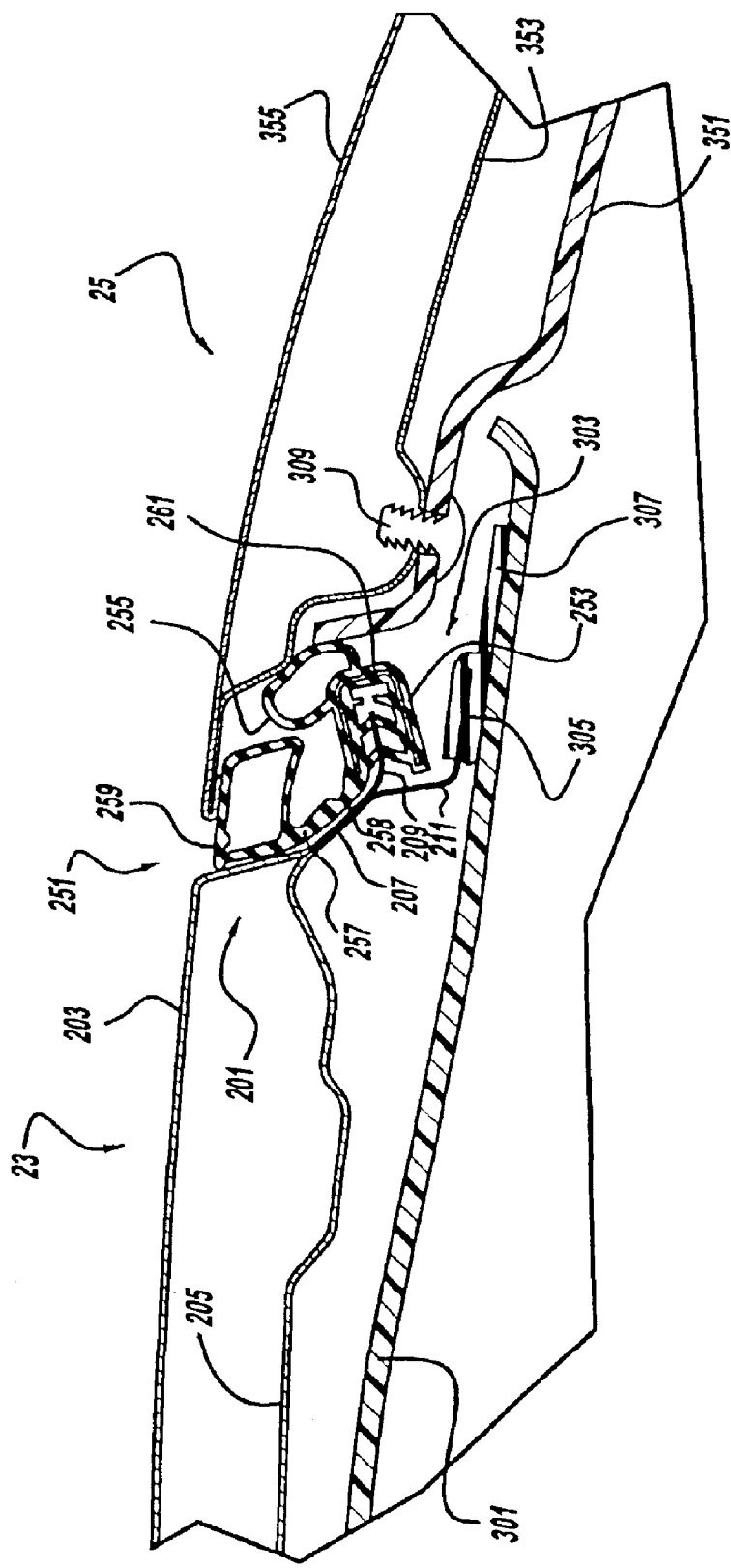
FIG. 9 is a fragmentary, centerline cross sectional view, like that of FIG. 4, showing the preferred embodiment apparatus, disposed in the fully raised position.

FIGS. 8 and 9 illustrate a peripheral roof structure 201 at the peripheral mating of an outer front roof panel 203 and an inner front roof panel 205. Front roof panels 203 and 205 contact each other for MIG welding at joining area 207, however, peripheral flanges 209 and 211 of the outer and inner panels, respectively, then have a diverged orientation relative to each other, which terminates in their outboard or distal edges.

A rubber or polymeric elastomer weatherstrip 251 has a U-shaped carrier 253, a hollow and flexible first bulb 255 projecting from a corner of carrier 253, a flexible and bridging water trough section 257 with a reduced thickness living hinge 258, and a hollow and flexible second bulb 259 disposed on a distal edge of water trough 257. A U-shaped metal insert 261 is encapsulated only within carrier 253 and no other metal structure is located within the weatherstrip in this preferred embodiment. Instead, the water trough section relies on the adjacent shape of peripheral roof structure 201 for support when carrier 253 is pushed onto the single thickness of peripheral flange 209 of the outer front roof panel.

A front interior trim panel, preferably a cloth covered and resinated foam headliner 301, is secured to peripheral flange 211 of inner front roof panel 205 by a polymeric clip 303, having an h cross-section shape. An opening between a pair of bifurcated legs 305 receives peripheral flange 211 while a body 307 is secured to a hidden, back side of headliner 301 by staples or an adhesive. Polymeric Christmas-tree fasteners 309 attach the front of front and rear headliners 301 and 351 to their respective front and rear roof inner panels 205 and 353 in a hidden manner when the convertible roof is fully raised as shown in FIG. 9. A metal, rear outer roof panel 355 is welded to rear inner roof panel 353.

While various embodiments of the hard-top convertible roof apparatus have been disclosed, it should be appreciated that variations may be made to the present invention. For example, the presently disclosed weatherstrip can be used in other areas of the vehicle. Furthermore, the present roof structure, weatherstrip and/or headliner attachment may be used at a front header-to-one bow interface or at a five bow-to-tonneau cover/decklid/tulip panel interface (for soft or hard-tops). Also, the hard-top roofs can be covered with vinyl, fabric or painted, or can include transparent glass panels. Moreover, a second weatherstrip can replace the headliner clip. It should also be appreciated that three or more hard-top sections can be employed with the present apparatus between each. The presently disclosed headliner component may further be replaced by rigid, polymeric garnish molding components or lamp components. While various materials and shapes have been disclosed, it should be appreciated that various other shapes and materials can be employed. It is intended by the following claims to cover these and any other departures from the disclosed embodiments which fall within the true spirit of this invention.

The invention claimed is:

1. A convertible roof system comprising:
   a front hard-top roof section movable from a closed position to an open position;
   a rear hard-top roof section movable from a closed position to an open position;
   a peripheral roof structure provided on at least one of the hard-top roof sections, the peripheral roof structure having an inner roof panel, an outer roof panel and a joining section, the inner and outer roof panels contact each other and are permanently joined together at the joining section, the peripheral roof structure further including peripheral edge flanges which have a diverging orientation;
   a weatherstrip secured to one of the peripheral flanges; and
   an interior trim fastener secured to another of the peripheral flanges.

2. The system of claim 1 wherein the weatherstrip comprises a substantially U-shaped carrier and a first bulb, the carrier being attached to the corresponding peripheral flange.

3. The system of claim 2 wherein the weatherstrip further comprises a second bulb coupled to the carrier.

4. The system of claim 3 wherein the weatherstrip further comprises a bridging section connecting at least one of the bulbs to the carrier, the bulbs being spaced apart from each other and the area between the bulbs acting as a water drain trough.

5. The system of claim 1 wherein the weatherstrip further comprises at least a pair of spaced apart bulbs, the portion of the weatherstrip between the bulbs acting as a water drain trough.

6. The system of claim 5 wherein the bulbs are substantially hollow and flexible.

7. The system of claim 1 further comprising a headliner attached to the front roof section by the interior trim fastener.

8. The system of claim 7 wherein the headliner includes a pre-formed, resinated foam, substrate.

9. The system of claim 7 wherein the headliner includes a pre-formed, resinated fiberglass, substrate.

10. The system of claim 1 wherein the front and rear roof sections are stowed in a substantially vertical and nested orientation when in their open positions.

11. The system of claim 1 wherein the weatherstrip seals between the front and rear roof sections when the roof sections are in their closed positions.

12. A convertible roof system comprising:

a first roof section movable from a raised position to a stowed position, the first roof section having a single-thickness peripheral flange; and a weatherstrip including at least a carrier, a first bulb and a second bulb, the carrier being secured to at least opposite faces of the single-thickness peripheral flange.

13. The system of claim 12 wherein the first roof section is a first hard-top roof section.

14. The system of claim 13 further comprising a second hard-top roof section movable from a raised position, adjacent the first roof section, to a stowed position.

15. The system of claim 12 wherein the first roof section further comprises a second peripheral flange spaced apart from the single-thickness peripheral flange.

16. The system of claim 15 further comprising an interior trim fastener secured to the second peripheral flange.

17. The system of claim 15 wherein the roof section further comprises an outer roof panel and an inner roof panel, the roof panels are permanently joined together at a joint area inboard of the peripheral flanges.

18. The system of claim 12 wherein the first roof section is located in a substantially vertical orientation below a vehicular beltline when in its stowed position.

19. The system of claim 12 wherein the weatherstrip extends in a substantially cross-car direction along a rear portion of the roof section when viewed in its raised position.

20. The system of claim 12 wherein the weatherstrip further comprises a living hinge located in a bridging segment between the bulbs, the bulbs being spaced apart from each other, the bridging segment being a unitary and homogeneous type of flexible material.

21. A convertible roof weatherstrip comprising:

a substantially U-shaped carrier;

a flexible bulb projecting from the carrier;

a second flexible bulb; and a bridge connecting the second bulb to the carrier and spacing apart the bulbs from each other;

wherein the weatherstrip is adapted for use along a cross-car section of a retractable, hard-top roof section.

22. A convertible roof weatherstrip comprising:

a substantially U-shaped carrier;

a flexible bulb projecting from the carrier;

a second flexible bulb;

a bridge connecting the second bulb to the carrier and spacing apart the bulbs from each other; and a reduced thickness, living hinge located in the bridge.

23. A convertible roof weatherstrip comprising:

a substantially U-shaped carrier;

a flexible bulb projecting from the carrier;

a second flexible bulb;

a bridge connecting the second bulb to the carrier and spacing apart the bulbs from each other; and a metallic insert encapsulated only within the carrier and the bridge being free of the metallic insert.

24. The weatherstrip of claim 21 wherein a section of the bridge is annularly offset from an adjacent, substantially rigid side wall of the carrier when installed.

25. An automotive convertible roof apparatus comprising a first retractable hard-top external roof panel and an internal roof panel permanently joined to the external roof panel at a joint, each of the roof panels having a peripheral flange which diverge from each other outboard of the joint.

26. The apparatus of claim 25 further comprising a retractable second hard-top external roof panel located adjacent the first external roof panel when both are in their raised positions, the external roof panels being retractable to substantially vertical orientations.

27. The apparatus of claim 25 further comprising a weatherstrip mounted to one of the flanges and a trim fastener coupled to the other of the flanges.

28. A method of assembling a convertible roof having a retractable first roof section, a retractable second roof section, and a weatherstrip, at least one of the roof sections having an inner roof panel and an outer roof panel, the method comprising:

(a) welding together the inner and outer roof panels at a joint;

(b) pushing a carrier of the weatherstrip onto a single thickness flange of one of the roof panels;

(c) flexing a drain trough of the weatherstrip which bridges between at least two hollow bulbs of the weatherstrip;

(d) compressing the hollow bulbs of the weatherstrip between the first and second roof sections; and (e) allowing the first and second roof sections to automatically retract.

29. The method of claim 28 further comprising spacing a second peripheral flange of one of the roof panels away from the single thickness flange outboard of the panel joint and attaching a component to the second flange.

\* \* \* \* \*